United States Patent
Broda et al.

(10) Patent No.: US 7,707,513 B2
(45) Date of Patent: Apr. 27, 2010

(54) SYSTEM FOR STREAMING DATA FROM SERVER TO MULTIPLE SLAVE BROWSER WINDOWS IN CLIENT COMPUTER THROUGH A MASTER BROWSER WINDOW

(75) Inventors: Tal Broda, Sunnyvale, CA (US); Blake Sullivan, Redwood City, CA (US); Xi Li, Sunnyvale, CA (US); Edward J. Farrell, Los Gatos, CA (US); Yuan Gao, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 12/026,819

(22) Filed: Feb. 6, 2008

(65) Prior Publication Data

US 2009/0198787 A1 Aug. 6, 2009

(51) Int. Cl.
*G06F 3/048* (2006.01)
(52) U.S. Cl. .................. 715/804; 715/783; 715/797; 715/803
(58) Field of Classification Search ................. 715/513, 715/705, 501.1, 700, 804, 803, 783, 797; 709/227, 217, 218, 219; 434/350; 713/100; 714/11; 705/14
See application file for complete search history.

(56) References Cited

U.S. PATENT DOCUMENTS

| | | | |
|---|---|---|---|
| 2001/0018738 A1* | 8/2001 | Mori et al. ................... 713/100 |
| 2002/0138624 A1* | 9/2002 | Esenther ..................... 709/227 |
| 2005/0119935 A1* | 6/2005 | Boss et al. .................... 705/14 |
| 2006/0089939 A1  | 4/2006 | Broda et al. |
| 2006/0224951 A1* | 10/2006 | Burke et al. ................ 715/513 |
| 2006/0294418 A1* | 12/2006 | Fuchs ......................... 714/11 |
| 2007/0196807 A1* | 8/2007 | Packard et al. .............. 434/350 |
| 2007/0240054 A1* | 10/2007 | Todoroki et al. ............ 715/700 |
| 2007/0256003 A1* | 11/2007 | Wagoner et al. ......... 715/501.1 |
| 2008/0028311 A1* | 1/2008 | Greggo-McManus et al. ........... 715/705 |

* cited by examiner

*Primary Examiner*—Le Luu
(74) *Attorney, Agent, or Firm*—Squire, Sanders & Dempsey, LLP (57) ABSTRACT

A client computer has a master window and at least one slave window. The client computer receives streaming data at the master window. The master window includes a list of slave windows and the data includes an envelope that has a destination window identifier. The master window determines a destination window that corresponds to the window identifier. The master window dispatches the data to a slave window if the destination window is not the master window. Otherwise, the master window streams the data to the destination within the master window.

20 Claims, 7 Drawing Sheets

SYSTEM FOR STREAMING DATA FROM SERVER TO MULTIPLE SLAVE BROWSER WINDOWS IN CLIENT COMPUTER THROUGH A MASTER BROWSER WINDOW

FIELD OF THE INVENTION

One embodiment is directed generally to Internet browsers, and in particular to transmitting data to multiple Internet browser windows.

BACKGROUND INFORMATION

Business intelligence ("BI") and Business Activity Monitoring ("BAM") systems have been developed that combine data gathering, data storage, and knowledge management with analytical tools to present complex and competitive information to planners and decision makers. Many conventional business intelligence systems include modules and programs that provide visual reporting of information regarding the status and operation of business processes in a full-page display panel known as a "dashboard". These systems frequently utilize messaging, data integration, data caching, analytics monitoring, alerting, and reporting technologies to deliver configurable information to an end user within seconds of an enterprise event or change in status. Streaming data delivery ensures that real-time reports or data displays are automatically and continually updated as changes occur in the underlying data. Therefore, managers and business executives can monitor end-to-end business processes in real-time and make decisions and take immediate actions that impact overall business performance.

The dashboard and other user interfaces of many known BI systems utilize multiple browser windows to display the data that may be pushed from a server. One known method to push data to multiple windows is to create a push channel from each browser window to the server. The push channel is typically implemented as a persistent connection to the server. However, this creates multiple physical connections to the server and may present scalability concerns. Further, most web browsers restrict the number of open connections to the server in order to govern the resource requirements of a particular window.

Other known systems that utilize multiple browser windows create an extra and separate window that holds the push channel. This window serves as the focal point for receiving and dispatching events for other browser windows but is not itself a destination for data. One problem with this approach, however, is that this extra window has to be opened by one of the browser windows that needs that data, and a popup blocker may block the creation of this window. Even in the case that the window is successfully opened, it can be confusing or annoying to the user. As a result, the user may accidentally or intentionally close the extra window, which will break the channel and prevent data from reaching the other browser windows.

SUMMARY OF THE INVENTION

One embodiment is a client computer that has a master window and at least one slave window. The client computer receives streaming data at the master window. The master window includes a list of slave windows and the events on the data stream include envelopes that have a destination window identifier. The master window determines a destination window that corresponds to the window identifier. The master window dispatches the data to a slave window if the destination window is not the master window. Otherwise, the master window streams the data to the destination within the master window.

DETAILED DESCRIPTION

One embodiment is a system that pushes data to multiple browser windows on a client computer without requiring a page refresh in the windows. One of the browser windows is designated the master window and the remaining windows are designated slave windows. The master window initiates the data channel to the server computer.

Figure 1:
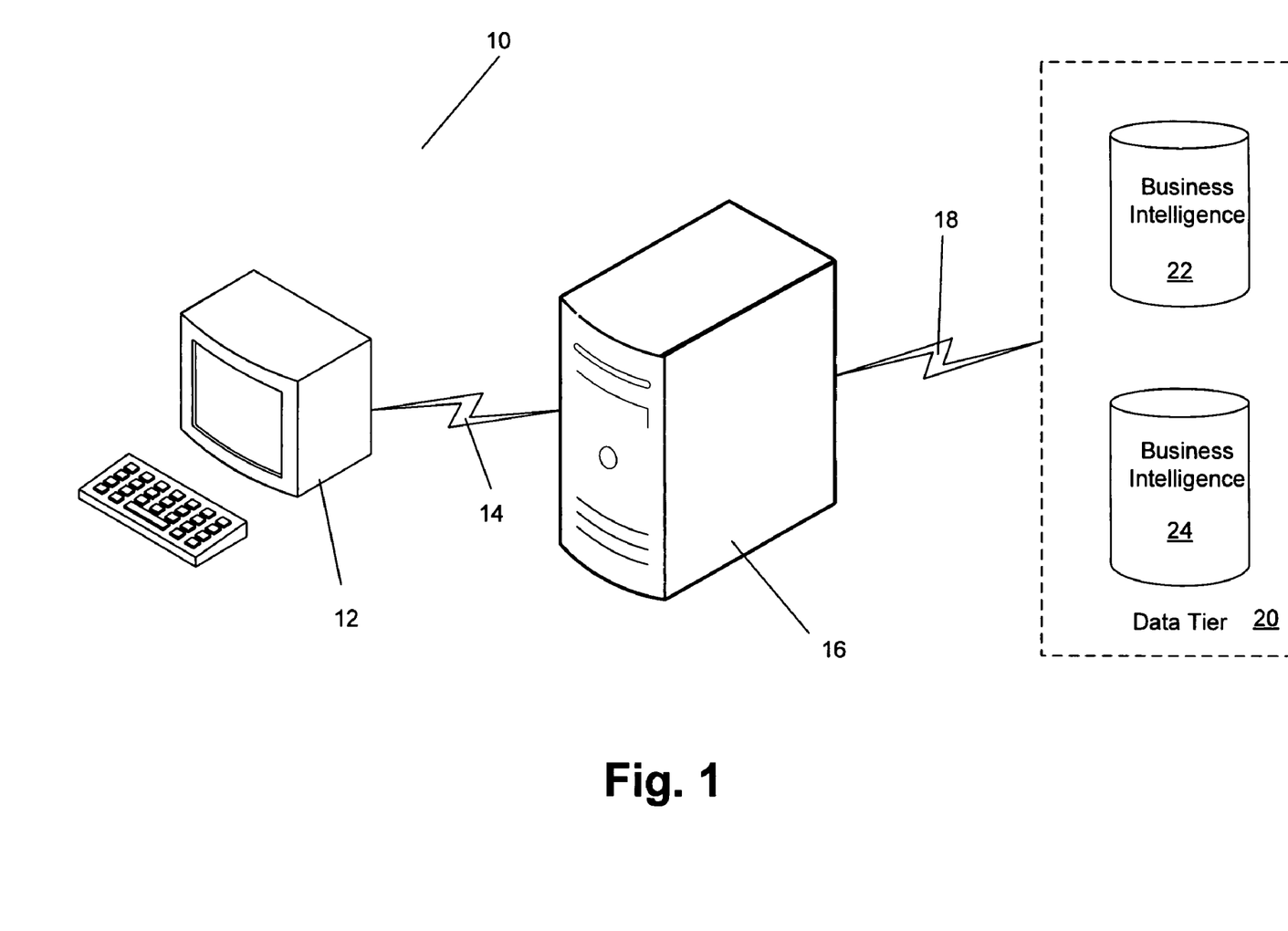
FIG. 1 is a block diagram of a data streaming system in accordance with one embodiment.

FIG. 1 is a block diagram of a data streaming system 10 in accordance with one embodiment. System 10 includes a client computer 12 that receives and displays streaming data in multiple browser windows. Client computer 12 includes a processor and memory for storing instructions (not shown). The memory can be any type of memory or other computer readable media that stores instructions that are executed by the processor. Client 12 can be any type of computer or other computing device that provides a user interface that can generate and display multiple Internet browser windows, including a personal digital assistant ("PDA"), telephone, etc. In one embodiment, client 12 executes an operating system and an Internet browser.

Client 12 is coupled to a server computer 16 via a link 14. Link 14 is any type of local or network connection that enables client 12 to communicate and exchange data with server 16. In one embodiment, link 14 is an HTTP/S connection made over the Internet. Server 16 includes a processor coupled to memory for storing instructions (not shown). The memory can be any type of memory or other computer readable media that stores instructions that are executed by the processor.

Server 16 is coupled, either locally or remotely, to a data tier 20 via a link 18. Data tier 20 in one embodiment includes multiple databases 22 and 24 that store Business Intelligence ("BI") data, which in one embodiment is data that reflects the status and business operations of an organization. The data stored in data tier 20 may include data that is generated by an organization's enterprise resource planning ("ERP") system, customer relationship management ("CRM") system, customized legacy system, multi-dimensional/relational database management systems, etc. As data in these various systems change (e.g., a sale is made, a new employee is hired, payroll is processed, etc.), the changed data or "active" data is ultimately streamed to client 12 by server 16 so that the changes and updated data can be viewed by a user at client 12. In other embodiments, other types of data besides BI data may be stored on data tier 20 and streamed to client 12.

Figure 2:
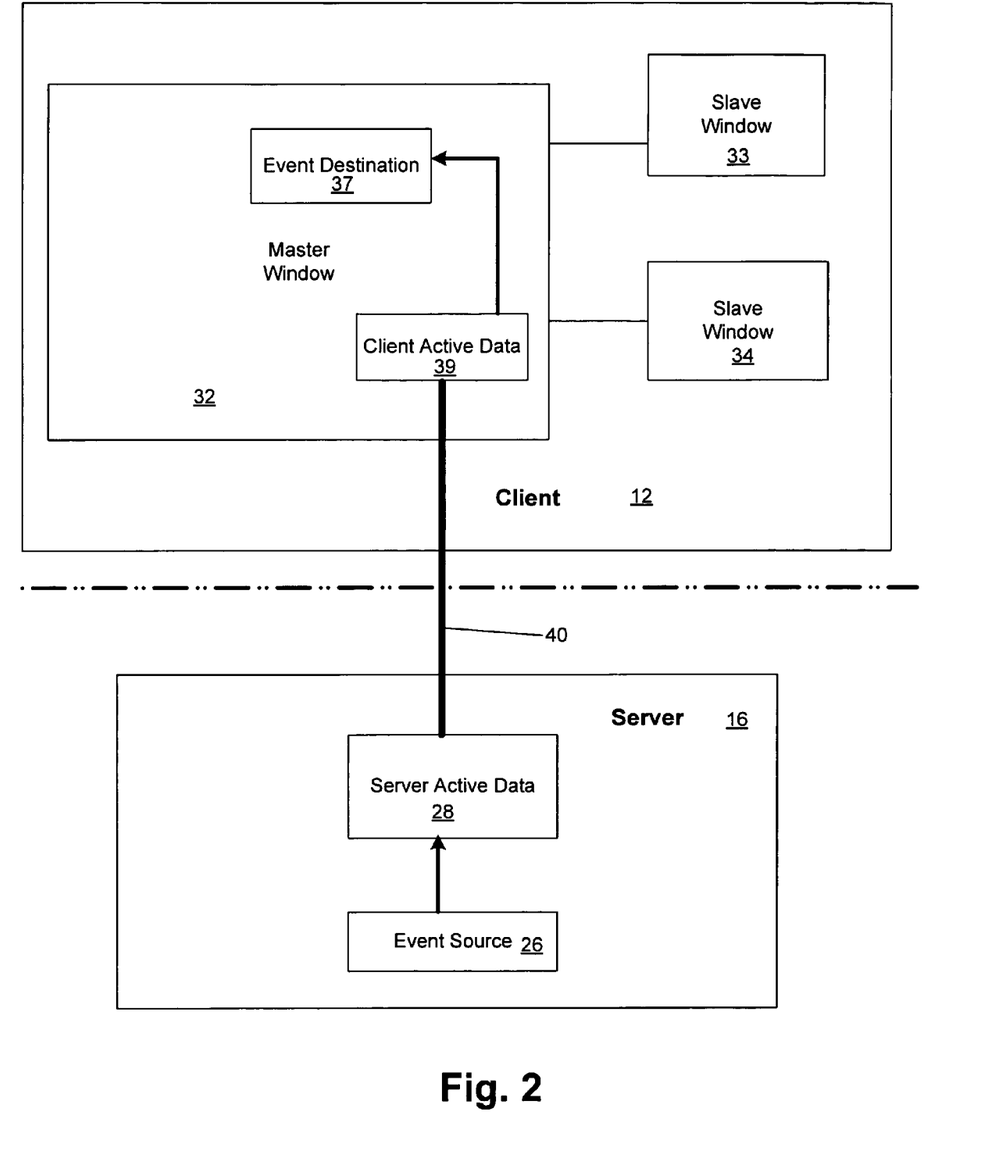
FIG. 2 is a block diagram of a client computer and a server computer in accordance with one embodiment for streaming data events from the server to the client.

In one embodiment, server 16 receives data events or active data that is transmitted or streamed to client 12 for display in web pages on multiple browser windows on client 12 without requiring page refreshes. In one embodiment, the data events are changing data that are generated by data tier 20. FIG. 2 is a block diagram of client computer 12 and server computer 16 in accordance with one embodiment for streaming data events from server 16 to client 12.

Client 12 includes multiple browser windows 32-34. Each browser window 32-34 may be part of a separate Internet browser, or may be part of the same browser (i.e., multiple browser windows within the same Internet browser) or can be any type of window that has a destination that is capable of receiving streaming data on an active page in the browser. In one embodiment, each window 32-34 is identified by a unique window ID. In one embodiment, the window ID is stored in window.name, a browser-independent document object model ("DOM") property in the window object that allows the window to be found using the window.open call.

One of windows 32-34 is designated as the "master" window (i.e., window 32 of FIG. 2) and the remaining windows are designated as "slave" windows (i.e., windows 33 and 34 of FIG. 2). Each window 32-34 includes at least one event destination 37 and a client active data module 39. In one embodiment, each of these modules are software instructions stored in memory and executed by a processor.

Each event destination 37 is the destination on a page within the window where an active data event is placed when it is streamed to that window. An event destination 37 is identified by a destination ID. Event destination 37 in one embodiment is a rich interactive user interface ("UI") component in a browser, but it can be any invisible framework level component. In one embodiment, event destination 37 is a JavaServer Faces ("JSF") component. JSF, from Sun Microsystems, Inc., is a Java-based web application framework that simplifies the development of user interfaces for Java Platform, Enterprise Edition applications. JSF uses a component-based approach in which the state of user interface components is saved when the client requests a new page and then is restored when the request is returned. In one embodiment, the destination ID is usually unique inside a page only.

Client active data module 39 performs the functionality disclosed below, including active data delivery and multiplexing, delivering active data events to event destination 37 and establishing master and slave windows. Client active data module 39 in the master window further establishes and manages a push channel 40 between client 12 and server 16.

Server 16 includes at least one event source 26 and a server active data module 28. Each event source 26 is the source of an active data event. An active data event fired from event source 26 includes event data (i.e., the payload) and an event timestamp, if available. The active data event in one embodiment is identified by a unique and increasing event ID. In one embodiment, the event ID uniqueness is at the event source level only.

Server active data module 28 is the server side module in one embodiment that performs the functionality disclosed below to enable active data delivery and multiplexing. Server active data module 28 receives active data events from event source 26 and delivers them to client active data module 39 of master window 32 via push channel 40.

Figure 3:
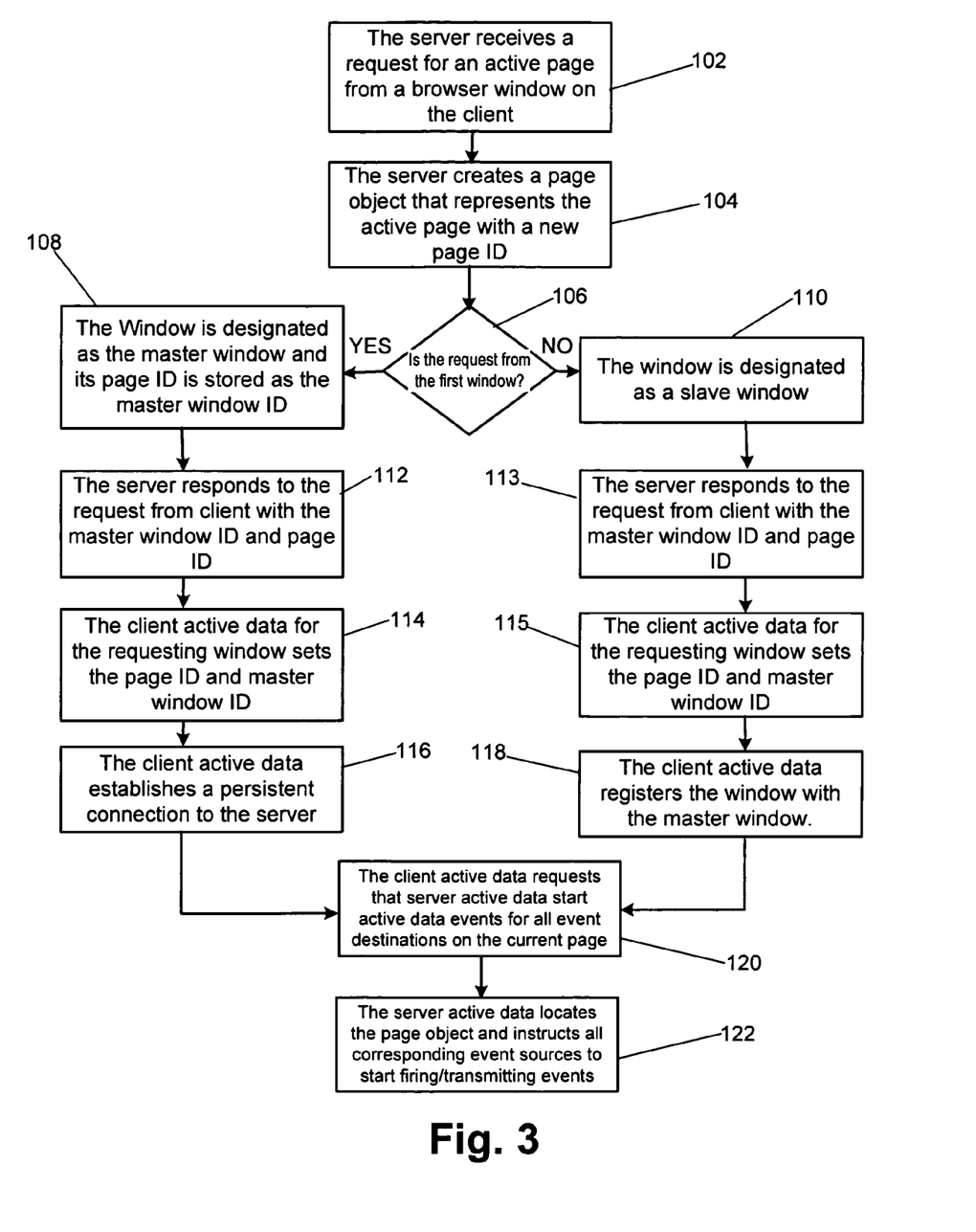
FIG. 3 is a flow diagram of the functionality of the client and the server when a registration request for active data is generated from a browser window on the client in accordance with one embodiment.

FIG. 3 is a flow diagram of the functionality of client 12 and server 16 when a registration request for active data is generated from a browser window on client 12 in accordance with one embodiment. In one embodiment, the functionality of the flow diagram of FIG. 3, and FIGS. 4-7 below, is implemented by software stored in memory or other computer readable or tangible medium, and executed by a processor. In other embodiments, the functionality can be performed by hardware, or any combination of hardware and software.

At 102, server 16 receives a request for a web page that includes active data (i.e., an "active page"). The request may be generated by a user selecting a Uniform Resource Locator ("URL") from a web page within a web browser window on client 12. The request identifies a page on server 16 as the target of the request.

At 104, server active data 28 creates a page object that represents the active page with a new page ID and renders the page. Further, server active data 28 stores an association of all the event destinations on the rendered page with corresponding event sources. Server active data 28 further assigns the page object as a listener to all event sources. This allows the page object to receive events from event source 26. Active data delivery has not begun at this point as the client has not indicated that it is ready to receive active data.

At 106, server active data 28 determines if the request is from the first window making the request in the current session. In one embodiment, the master window ID is set as a session scope variable and it is determined if the master window ID has been set by server active data 28. If multiple concurrent initial requests come in from multiple browser windows on one client, such as from a multi-core server machine, the process of checking and setting the master window ID should be synchronized across the requests.

At 108, if the request is the first window, the window making the request is designated as the master window and its page ID is stored as the master window ID. At 110, if the request is not the first window, the window making the request is designated as a slave window.

At 112 and 113, server 16 responds to the request from client 12. The response includes the master window ID and page ID.

At 114 and 115, client active data 39 for the requesting window sets the page ID and master window ID. It further sets the browser window ID with its page ID and makes itself available from the browser window DOM.

At 116, for the master window, client active data 39 establishes channel 40 by creating a persistent connection to server 16. In one embodiment, the channel is established by making an Hypertext Transfer Protocol ("HTTP") POST request from a Frame or IFrame in the browser page to server 16, which then holds on to the response object without closing it. In another embodiment, the channel is established by using a long poll to server 16. The poll returns when there are events on the server side or a connection timeout, at which point the polling is attempted again.

At 118, for the slave window, the client active data module for the slave window finds the master window via the master window ID by invoking a window.open call and registers the window with the master window. With the master window ID, the slave window finds the client active data module of the master window and passes its own window reference and window ID to it for registration. The master window adds the slave window (i.e., window ID and window reference) to its internal list of active windows and includes a time stamp.

At 120, the client active data module of the requesting window requests that server active data 28 start active data events for all event destinations on the current page. The request includes the page ID. In one embodiment, only event destinations currently visible on the current page are started.

At 122, server active data 28 locates the page object and instructs all corresponding event sources 26 to start firing/transmitting events.

In one embodiment, steps 116 and 120 may be combined for the master window in one single round trip to server 16.

Figure 4:
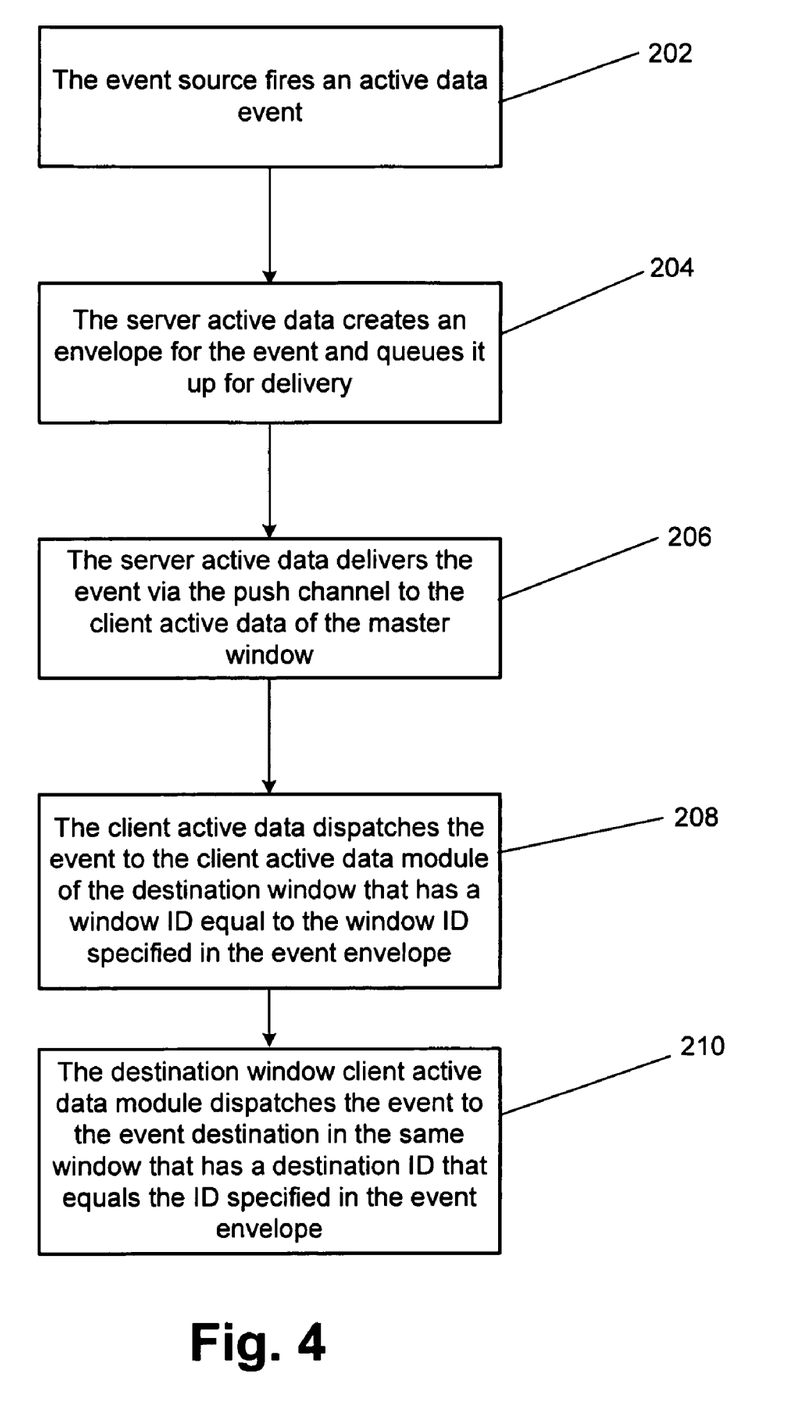
FIG. 4 is a flow diagram of the functionality of the client and the server to stream multiplexed data from its event source in the server to its event destination of a window on the client in accordance with one embodiment.

FIG. 4 is a flow diagram of the functionality of client 12 and server 16 to stream multiplexed data from its event source in server 16 to its event destination of a window 32-34 on client 12 in accordance with one embodiment.

At 202, event source 26 fires an active data event. The event includes a unique event ID and event data (i.e., payload). It also identifies its event source.

At 204, server active data 28 creates an envelope for the event and queues it up for delivery. The envelope includes a window ID, destination ID, event ID and timestamp. If an event timestamp is not available in the event, server active data 28 adds the current timestamp to the envelope. In one embodiment, since a page object is created and set up to listen to events from an event source at 104 of FIG. 1, when an event is fired from an event source, the page object in server active data 28 will receive the event. To create the envelope, server active data 28 looks up the event source to find its event destination and sets its ID as the destination ID on the envelope, sets the page ID as the window ID on the envelope, and adds the event ID and timestamp onto the envelope.

At 206, server active data 28 delivers the event via push channel 40 to client active data 39 of master window 32.

At 208, client active data 39 dispatches the event to the client active data module of the destination window that has a window ID equal to the window ID specified in the event envelope. The event can be targeted to the master window itself, or to any of the slave windows. If the window ID in the event envelope is the master window ID, the functionality at 208 may be skipped in one embodiment. In another embodiment, client active data 39 compares the window ID in the event envelope with the master window ID that it stores. If there is a match, the event is targeted to the master window. If there is not a match, client active data 39 goes through its list of slave windows (which is compiled at 118 of FIG. 3) and finds the window reference corresponding to the window ID in the event envelope. The window reference may also be obtained by a DOM window.open call. If no window reference with the specified window ID is found, it is assumed that the user has closed the window and the event is ignored and the window unregistered from the client and server. From the window reference, client active data 39 can then determine the client active data module in that slave window (i.e., the destination window). Therefore, the event is dispatched to the appropriate slave destination window, assuming the event is not destined for the master window.

At 210, the destination window client active data module dispatches the event to the event destination in the same window that has a destination ID that equals the ID specified in the event envelope.

In one embodiment, for channel 40 to be kept open, there has to be some activities between client 12 and server 16. If there are no events for a long time after the channel is established (i.e., no events after 122 of FIG. 3), or since the last event was sent, the idle connection should be broken, as disclosed below.

The connection between client 12 and server 16 may be dropped because of connection problems or network problems. When this happens, client active data 39 returns to 116 of FIG. 3. At this time, client active data 39 can re-establish the connection to server active data 28. During a period while the connection is down and channel 40 is not available, in one embodiment, events from event source 26 are queued but not delivered, which may consume memory resources especially under high event rate. Therefore, the server side active data module should stop active data production with the source servers, so that when the client manages to reestablish the connection it will not be overloaded with a lot of active data, but rather just the latest changes for every component.

In one embodiment, in order to reduce traffic, server active data 28 will keep track of a Boolean flag that indicates if a starting event has been requested by the client for each event source at 120 of FIG. 3. If a starting event is requested for an event source, the flag will be set but server active data 28 will not request the event source to start firing events unless the channel is also available at this time. If a slave window's start event request happens to reach server active data 28 before the establishing channel request, events will not be started prematurely and unnecessary queuing of events can be avoided.

Further, in one embodiment, when a channel is broken due to bad connection (temporary or permanent), server active data 28 will reset all the Boolean flags and ask all event sources to stop firing events. When the channel is re-established, all event sources with the flags set will be asked to start firing events from the last event ID passed in the start event request.

For example, in the case of a broken channel and subsequent reconnect, if the old channel broken event is detected on the server side after the reconnect request, all event sources will be asked to stopped firing events. This can happen during master window migration. If the master window is closed, refreshed or navigated away, the channel connection maintained by the old master window will be closed but may not be detected until after the new channel connection is established from the new master window. To resolve this issue, in one embodiment server active data 28 will keep track of an integer variable called Channel ID. At 116 of FIG. 3, the channel ID will be incremented each time a connection request comes in to establish a channel (which includes the initial connect case, or the reconnect case due to bad connection or migration). The current channel ID will be passed into and stored as a local variable of the thread that is responsible for writing responses (i.e., sending events) to the browser.

Upon failure of writing either the keep-alive event or active data event to the response (206 of FIG. 4), the thread logic of server active data 28 will compare the channel ID it has to the current channel ID. In one embodiment, only when it is equal to the current channel ID will server active data 28 ask the event servers to stop firing events. If it is less, server active data 28 will ignore it as this implies that a newer channel has been created. The current channel ID is also wrapped in the event handler registered for callback on a broken TCP/socket connection. If it is called before server active data 28 has a chance to write to the response, the same logic will be executed.

In this embodiment, if the new channel is established before the old channel broken event is detected, the current channel ID would have been incremented, and stored as a local variable in the new response-writing thread, as well as wrapped in the new broken TCP/socket connection handler. Therefore, when the old channel broken event is detected, it will not falsely stop active data events.

In one embodiment, since every request coming in will create a page object in server active data 28 representing the current page in the browser window, there will be situations where these objects become stale, including the following: (a) the user closes the browser window; (b) the user goes back to the previous page using the browser "Back" button; (c) the user goes forward to the next page using the browser "Forward" button; (d) the user refreshes the current page using the browser "Refresh/Reload" button; (e) the user navigates to another active page; (f) the user navigates to a non-active page; (g) the browser window crashes (i.e., abnormal exit); and (h) any page redirect. Stale page objects may be cleaned up in any combination of the following methods.

To cleanup slave windows, in one embodiment, at 115 of FIG. 3, the slave window client active data also installs an event handler for the navigation and window close event for the slave windows, just like the master window. In the event handler, the current page ID (i.e., the page going away) is passed to server active data 28, via an asynchronous background request such as AJAX, and asks server active data 28 to clean up the corresponding page object and detach itself from all its event sources. This may fail due to bad client/server connection. Optionally, the slave window can also ask client active data 39 of master window 32 to remove itself from the slave window list.

To cleanup the master window, the same process as above can occur in addition to migration flow disclosed below. However, this will delay the migration and impact user experience due to potential network delay, and it may also fail.

In order to perform a "lazy" cleanup, at 208 of FIG. 4, upon delivery error, the window ID in the event envelope is the page ID of the page that can be cleaned up. The window ID is passed to server active data 28, which cleans up the page. Client active data 39 may also record the page IDs already sent for cleanup to avoid unnecessary cleanup requests being sent to server active data 28.

If the client/server connection is lost, the previously disclosed cleanup methods will not work in one embodiment. During this time, any of the stale conditions (a) through (g) disclosed above may happen and the server will not have a way to know. Therefore, in one embodiment an "expiration" cleanup is performed in which a timer is installed upon disconnect with a configurable timeout. Upon timeout, server active data 28 will cleanup all the page objects and reset its master window ID. If the channel is restored before the timeout, server active data 28 will cancel the timer (right after 116 of FIG. 3).

If the channel is restored after the timeout and cleanup has already occurred (i.e., the page object cannot be found at 116 of FIG. 3), server active data 28 will return immediately and instruct the client active data module to reload the full page, in all of the pages that were open, master and slaves. This will trigger the delivery infrastructure setup methodology of FIG. 4. This also applies when the establishing channel request comes in after session timeout, which cleans up all objects in the session including all the page objects, or failover to another server without state replication.

This will also trigger the migration methodology disclosed below. The slave window, if available, chosen to be the new master window will attempt to reconnect, which will trigger the same logic above and reload itself. This process continues for all slave windows. During this process, the cleanup logic will send a page cleanup request to server active data 28. The page object will not be found and the request is ignored.

In any of the stale conditions (a)-(h) disclosed above, an event targeted to the original active page shown in the slave window will fail, thus causing a delivery error due to slave window activities. For condition (f), the browser window ID stays the same but the original active page no longer exists. For other situations, the browser window IDs have been changed.

In order to handle this type of delivery error, in one embodiment, the following is performed at 208 of FIG. 4:

If client active data 39 of the master window cannot find a window reference with the window ID in the event envelope, the window ID represents either a slave window that is gone and thus removed from the list that client active data 39 maintains, or the previous master window. The latter may happen when the previous master window is refreshed and migrated to the new page in the same browser window if there is only one active window, or migrated to a slave window. In this case, the event is safely discarded.

If the window reference is found, client active data 39 of the master window will retrieve the browser window ID from the window reference and compare it with the window ID associated with this window reference in its list. If they do not match, this means that the slave window has been refreshed or navigated to a new active page. In this case, the slave window reference, with its window ID, is removed from the list and the event is safely discarded.

If the window reference is invalid (client active data 39 of the master window gets an exception when trying to retrieve the browser window ID from the window reference, or when it tries to invoke a method on that window), this means that the slave window is closing, closed or crashed. In this case, the slave window reference is removed and the event is safely discarded.

If the window reference is valid and the window IDs match, client active data 39 of the master window will retrieve the client active data of the slave window from the window reference. This may fail if the slave window has been navigated to a non-active page. In this case, the slave window reference is removed and the event is safely discarded.

If the client active data module of the slave window is successfully retrieved, the event is dispatched.

In one embodiment, a broken channel can occur due to master window activities. Since the channel is established from the active page in the master window, if the active page is gone (stale conditions (a) through (g) above), the browser window (or the operating system on the client side in the case of stale condition (g)) will automatically close the open connection that represents the channel, causing all active data event delivery to fail.

In one embodiment, the existence of push channel 40 is always ensured. In "normal" cases (stale conditions (a) through (f) above), the master window will be migrated to one of the slave windows and the channel will be re-established from the new master window. In the "abnormal" case, stale condition (g), all slave windows will periodically monitor the master window and take action when the master window is no longer alive.

In one embodiment, due to network delay and timing, the knowledge of the master window on the server side (i.e., the master window ID kept by server active data 28) can be wrong and does not reflect what has already happened on the client side, leading to the slave window not able to find the master window. As a result, when a new browser window goes to an active page, or an existing slave window refreshes itself, or an existing slave window navigates to a new active page, the server will send down logic for the new page to register with the master window which no longer exists.

Such out-of-sync client/server states can occur in the following conditions: (a) Single window. Master window refreshed or navigate to another page, no migration. Page in a new slave window or the same window cannot find the master window; (b) Master window refreshed or navigate to another page, channel migrated to one of the slave windows. Before the new master window re-establishes the channel and updates the server's master window ID, the page request in a new slave window or from the old master window (refresh request or the new page request) reaches the server first; (c) Master window closed, channel migrated to one of the slave windows. Before the new master window re-establishes the channel and update the server's master window ID, the page request in a new slave window reaches the server first; (d) Master window closed or crashes, before broken connection is detected by server, and a page request in a new slave window reaches the server first; (e) Master window closed or crashes, broken connection detected by server, server waiting for master window to reconnect (to accommodate the possibility of temporary/intermittent connection loss such as a wireless connection going in and out of range), before the wait times out, a page request in a new slave window reaches the server.

All conditions disclosed above will cause the registration of the new slave window to fail in one embodiment. In all cases, there will be no active data for the new slave windows and the old master window (if it still exists). In the case of (d) and (e), there will be no active data for all existing slave windows as well.

To ensure an open connection and therefore the timeliness of event delivery when events do occur, in one embodiment server active data 28 can install a timer after 120 of FIG. 3 with a configurable timeout less than the normal time allowed by the client or the server to keep an idle connection open. When there is an event coming into server active data 28 at 202 of FIG. 4, the timeout is reset back to its initial value.

When the timer expires, server active data 28 will send an event (called the "keep-alive" event) to the client active data module at 206 of FIG. 4 and restarts the timer. This simulates network activity and keeps the connection open. Upon receiving the keep-alive event, the client active data module discards it.

In one embodiment, during a disconnect, events that are already sent onto the network may get lost and new events that are fired will not get delivered. In one embodiment, to ensure continuity of events, at 210 of FIG. 4 the client active data module of each window will record the last event ID delivered to an event destination in that window so that when the channel is re-established, the last event IDs of all event destinations can be used to instruct their corresponding event sources to start firing events from these event IDs.

Figure 5:
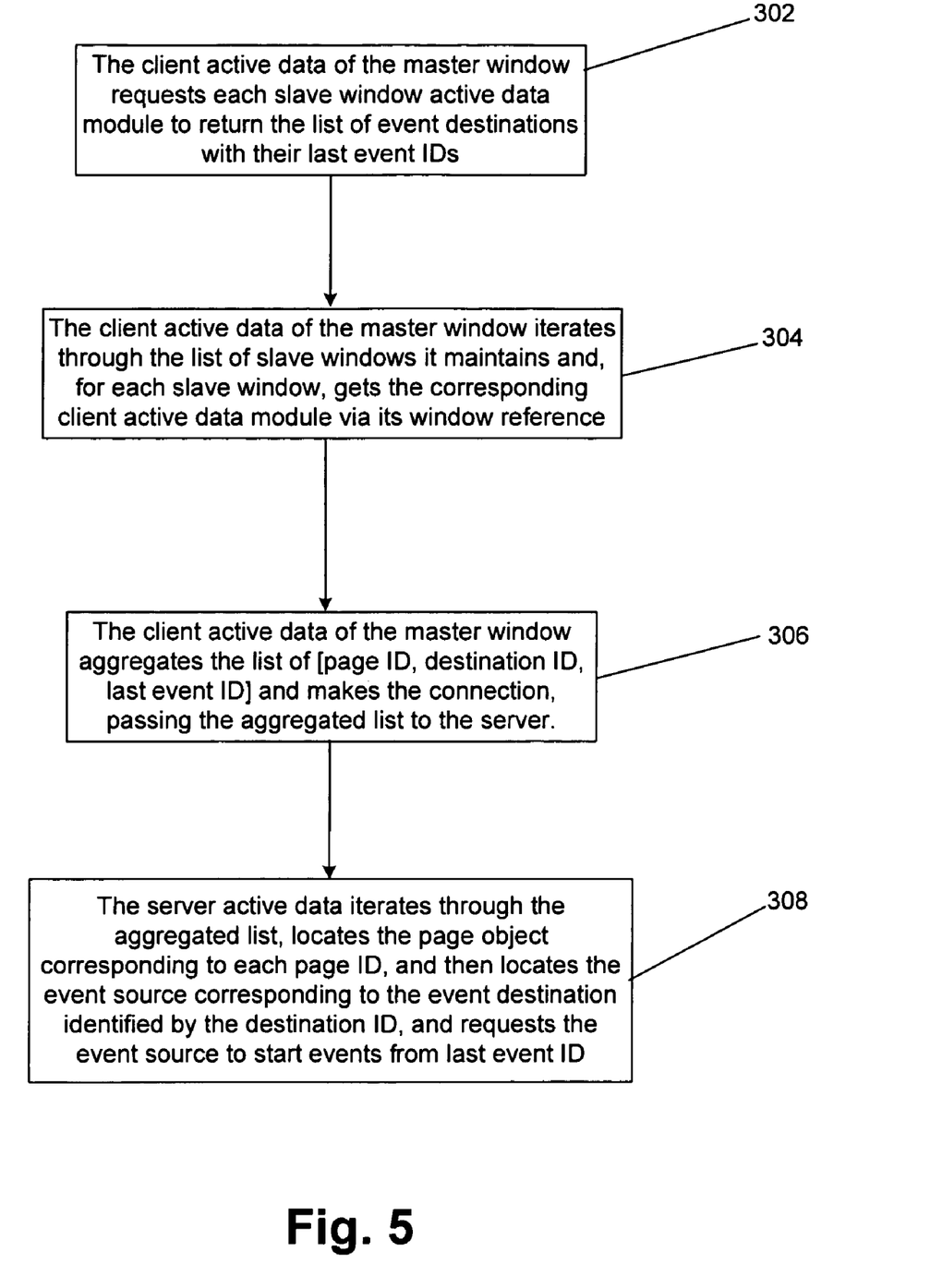
FIG. 5 is a flow diagram of the functionality of the client and the server during a reconnect attempt in one embodiment, which is carried out by the master window in accordance with one embodiment.

FIG. 5 is a flow diagram of the functionality of client 12 and server 16 during a reconnect attempt in one embodiment, which is carried out by the master window in accordance with one embodiment. For this process, instead of starting events for each active window one by one after the connection is established, it is accomplished with one server round trip. This is because at this time the master window has had knowledge of all its slave windows while in the initial channel establishing case, the master window is the first window, and the slave windows have not registered yet.

At 302, client active data 39 of the master window iterates through the list of slave windows it maintains and, for each slave window, gets the corresponding client active data module via its window reference.

At 304, client active data 39 of the master window requests each slave window active data module to return the list of event destinations with their last event IDs.

At 306, client active data 39 of the master window aggregates the list of [page ID, destination ID, last event ID] and makes the connection, passing the aggregated list to server 16.

At 308, server active data 28 iterates through the aggregated list, locates the page object corresponding to each page ID, and then locates the event source corresponding to the event destination identified by the destination ID, and requests the event source to replay events from the last event ID.

In one embodiment, the functionality of FIG. 5 requires that the event source supports the ability to replay all subsequent events from a specified event in the past. Since destination states (i.e., last event IDs) are managed by the client active data on the same page (i.e., not centralized in the master window), if any window crashes, the crash does not impact the active data continuity on other windows. In another embodiment, event sources that cannot replay all of the events (e.g., because the event is too old), or that determine that replaying a large number of events would be too expensive, can indicate that a refresh event should be sent to the client event consumer instead. This will cause the consumer to ask for a new snapshot of the data to use as a baseline for subsequent active data events.

Figure 6:
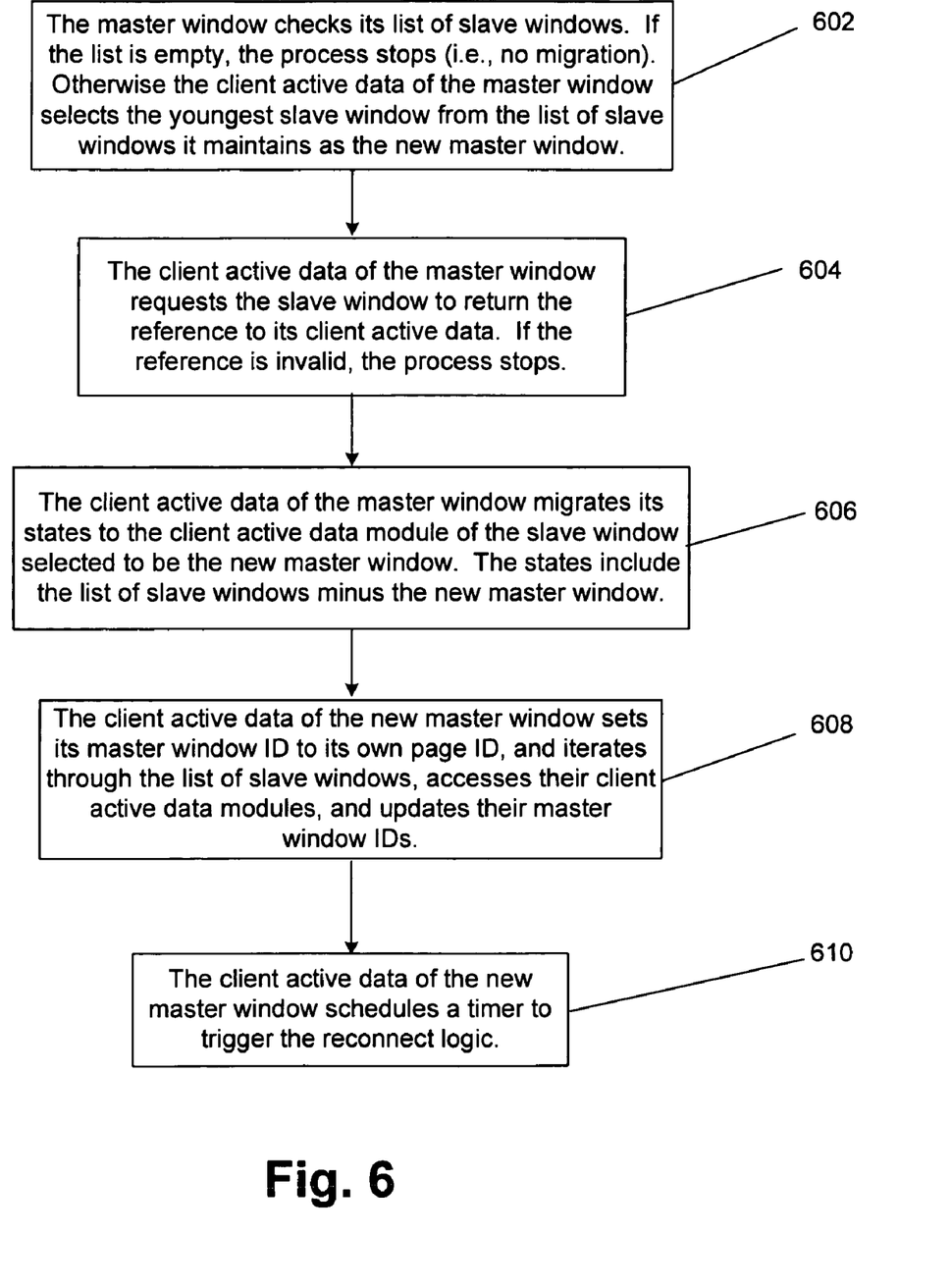
FIG. 6 is a flow diagram of the functionality of the client and the server when migrating the master window to one of the slave windows in accordance with one embodiment.

In one embodiment, it is necessary to migrate the master window to one of the slave windows such as, for example, in the case of the stale object conditions (a)-(f) disclosed above. FIG. 6 is a flow diagram of the functionality of client 12 and server 16 when migrating the master window to one of the slave windows in accordance with one embodiment. In one embodiment, in order to implement the functionality of FIG. 6, the client active data module for both the master and slave windows also installs an event handler for the navigation and window close event at 114 and 115 of FIG. 3. This is to ensure that migration will happen again if a slave window, which becomes the new master window, needs to migrate again. Alternatively, the event handler can be installed at 608 of FIG. 6. On navigation or window close, the browser window invokes the handler in client active data 39 of the master window.

At 602, if the current window is the master window (i.e., its page ID equals its master window ID), client active data 39 of the master window checks its list of slave windows. If the list is empty, the process stops (i.e., no migration). Otherwise client active data 39 of the master window selects the youngest slave window from the list of slave windows it maintains as the new master window. The timestamp provided during 118 of FIG. 3 is used to determine which slave window is the youngest.

The selection of the new master window is based on heuristics in order to determine which of the existing windows is most likely to stay around the longest in order to minimize future migrations. In one embodiment, the selection of the new master window is based on the time when the slave window registers with the master window (i.e., the window which issues the latest page request to an active page and is probably more likely to stay around for the longest time). Other embodiments may always choose the oldest window on the assumption that the user wants to keep it open, or using a combination of duration time and the type of window (e.g., modal windows or dialog windows might be ignored in preference to document windows, as these types of windows are more likely to be closed sooner). The selection of the new master window may be based on other mechanisms as well. For example, the client side framework in each window can notify the client active data module of the master window when there is a user gesture in that window, and the client active data module of the master window can record the last time an active data event is received for any slave window. Together this information will determine the last activity time in a slave window and on migration time, the master window can select the most recently used window as the master window.

At 604, client active data 39 of the master window requests the slave window to return the reference to its client active data. If the reference is invalid, the process stops.

At 606, client active data 39 of the master window migrates its states to the client active data module of the slave window selected to be the new master window. The states include the list of slave windows minus the new master window.

At 608, client active data 39 of the new master window sets its master window ID to its own page ID, and iterates through the list of slave windows, accesses their client active data modules, and updates their master window IDs.

At 610, client active data 39 of the new master window schedules a timer to trigger the reconnect logic. The logic is enhanced to update the master window ID on the server side. At 306 of FIG. 5, client active data 39 of the master window also passes in its page ID as the new master window ID. Server active data 28 also updates the master window ID with the page ID passed in. In the case of a normal reconnect, the two IDs should be the same.

610 allows the process to return to 606 and back to the beginning of FIG. 6 quickly without the network delay caused by the reconnection. The old master window can then carry out the user action (navigation or window close). The reconnect logic ensures active data continuity during and after the migration.

Figure 7:
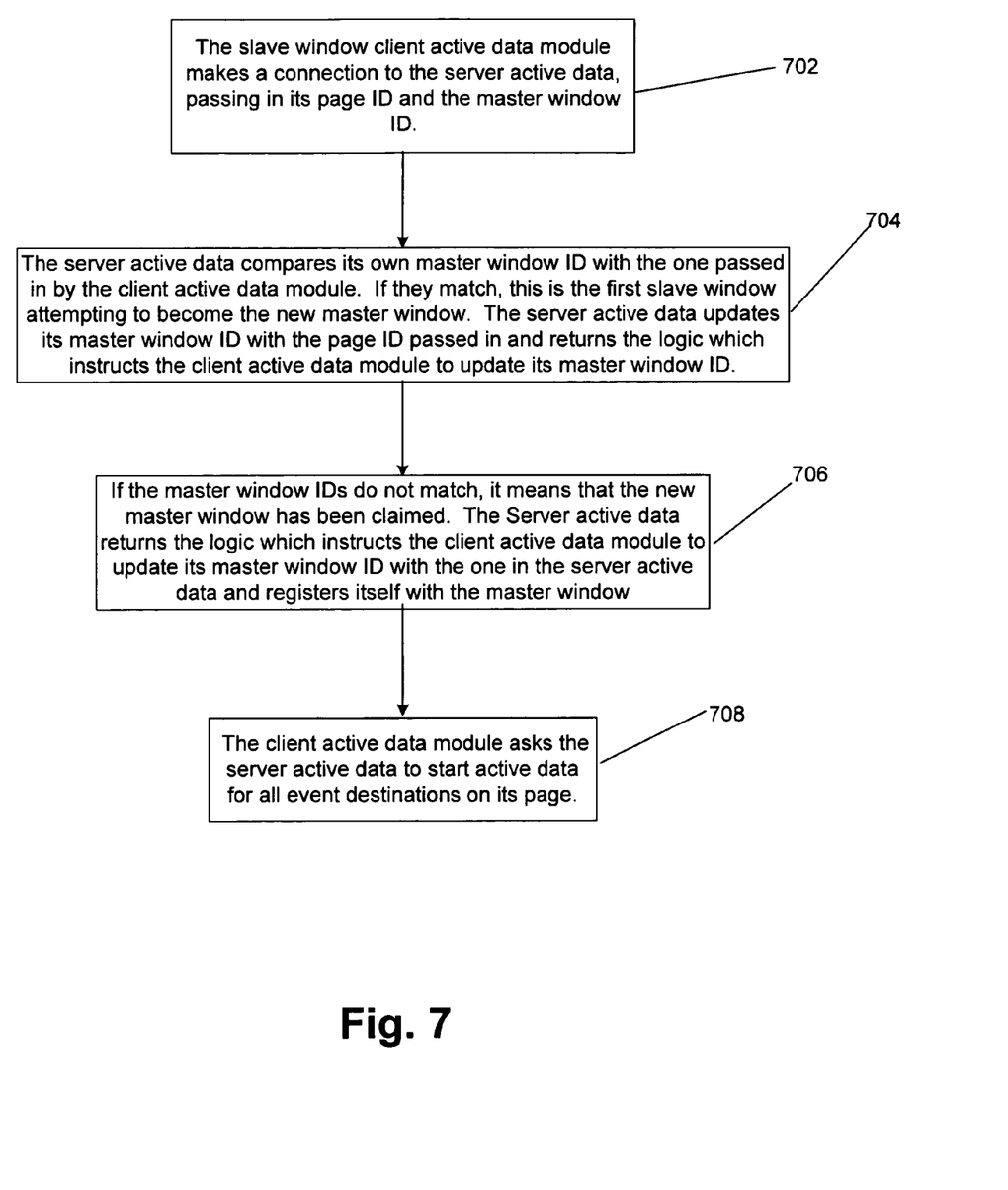
FIG. 7 is a flow diagram of the functionality of the client and the server in order to ensure that there is only one master window in accordance with one embodiment.

FIG. 7 is a flow diagram of the functionality of client 12 and server 16 in order to ensure that there is only one master window in accordance with one embodiment. In one embodiment, at 118 of FIG. 3, if the client active data module of the slave window fails to find the master window to register itself, it will attempt to claim itself as the master window using the functionality of FIG. 7. Further, at 115 of FIG. 3, before setting the browser window ID, the client active data module can compare its current browser window ID with the master window ID. If they match, the functionality of FIG. 7 can be executed.

At 702, the slave window client active data module makes a connection to server active data 28, passing in its page ID and the master window ID it keeps (the master window at this point is gone), effectively expressing its intent to replace the master window ID with its own window ID (which is set to its page ID).

At 704, server active data 28 compares its own master window ID with the one passed in by the client active data module. If they match, this is the first slave window attempting to become the new master window. Server active data 28 updates its master window ID with the page ID passed in and returns the logic which instructs the client active data module to update its master window ID. Server active data 28 also keeps the connection open by not closing the response object. This connection is the new push channel. At this point, the slave window becomes the new master window.

At 706, if the master window IDs do not match, it means that the new master window has been claimed. Server active data 28 returns the logic which instructs the client active data module to update its master window ID with the one in the server active data 28 and registers itself with the master window (same as 118 of FIG. 3). Server active data 28 also closes the connection. However, if the slave window is unable to register with the specified master window (e.g., the user might have closed the new master window in the meantime), the slave window will attempt to become the master window once again at step 702.

At 708, the client active data module then asks the server active data 28 to start active data for all event destinations on its page (same as 122 of FIG. 3).

In summary, server active data module 28 handles the following connection scenarios:

Initial connect from the master window to establish the channel, and start active data for the master window, both of which may come in one roundtrip;

Reconnect to re-establish the channel from the master window and start active data for all windows after network connectivity is restored;

Reconnect to re-establish the channel from the new master window and start active data for all windows after migration. This may fail due to contention.

Initial connect from a slave window trying to become the new master window and start active data for itself, both of which may come in one roundtrip. This may also fail due to contention.

The processing of all of these scenarios may be handled by client 12 and server 16 as follows:

On the client side, when the client active data module makes a connection to server active data 28, it always passes the following information in one embodiment:
  page ID;
  master window ID to replace;
  list of [page ID, destination ID, last event ID] for all event destinations in the current window and all slave windows in the list.

On the server side, server active data 28 compares the current master window ID with the master window ID passed in. If they match,
  replace the current master window ID with the page ID passed in;
  start events for all event sources corresponding to the event destinations passed in;
  start events for all other event sources with the start event flag already set;
  increment the channel ID;
  cancel the page object cleanup timer;
  hold on to the response object and keep the connection open. This becomes the new push channel;
  return the logic that instructs the client active data module to updates its master window ID.

On the server side, if the master window IDs do not match, server active data module 28 instructs the client active data module to:
  update its master window ID to the current master window ID kept by server active data module 28, which remains unchanged;
  register with the master window;
  ask server active data module 28 to start events for all event destinations on the current page with their last event IDs;
  check if the current page has a list of slave windows. If yes, get to their client active data modules and perform the above update, registration and start steps, then remove the list;
  close the connection.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A method of transmitting data to a client computer, the method comprising:
   receiving a request for a page from a requesting browser window on the client computer;
   determining if the request is from a first browser window;
   if the request is from the first browser window, designating the requesting browser window as a master window;
   if the request is not from the first browser window, designating the requesting browser window as a slave window;
   receiving data from a data source;
   creating an envelope for the data, wherein the envelope comprises an identifier of a destination window and the destination window is the slave window; and
   transmitting the data and envelope via a connection to the master window.

2. The method of claim 1, further comprising:
   if the request is from the first browser window, establishing the connection to the first browser window.

3. The method of claim 1, further comprising causing the master window to send the data to the slave window.

4. The method of claim 1, further comprising determining that the master window has closed, and designating a first slave window as a new master window.

5. A computer readable storage medium having instructions stored thereon that, when executed by a processor, causes the processor to:
   receive a request for a page from a requesting browser window on the client computer;
   determine if the request is from a first browser window;
   if the request is from the first browser window, designate the requesting browser window as a master window;
   if the request is not from the first browser window, designate the requesting browser window as a slave window;
   receive data from a data source;
   create an envelope for the data, wherein the envelope comprises an identifier of a destination window and the destination window is the slave window; and
   transmit the data and envelope via a connection to the master window.

6. A computer implemented method of receiving data comprising:
   receiving data at a master window at a browser on a client computer from a server computer, the master window comprising a list of slave windows and said data comprising an envelope that comprises a window identifier;
   determining a destination window that corresponds to the window identifier; and
   dispatching the data to a first slave window if the destination window is not the master window.

7. The method of claim 6, further comprising:
   sending a request for a first page to the server computer from a first requesting window;
   designating the first requesting window as the master window;
   establishing a connection to the server computer from the master window.

8. The method of claim 7, further comprising:
   sending a request for a second page to the server computer from a second requesting window;
   designating the second requesting window as a second slave window;
   registering the second slave window with the master window.

9. The method of claim 8, further comprising:
   determining that the first page has become stale; and
   designating the second slave window as a new master window if the first page has become stale.

10. The method of claim 7, further comprising:
    re-establishing the connection to the server computer from the master window upon a disconnection of the connection.

11. The method of claim 6, the master window comprising at least one data destination.

12. The method of claim 6, wherein the envelope further comprises a destination identifier, further comprising:
    streaming the data to a destination on the first slave window that corresponds to the destination identifier.

13. An apparatus for receiving streaming data that comprises a payload and an envelope that comprises a destination window identifier, the apparatus comprising:
    a master window coupled to a server computer that streams the data; and
    one or more slave windows coupled to the master window;
    wherein the master window comprises a list of the slave windows and comprises a master window client active data module that is adapted to receive the streamed data, determine a destination window from the destination window identifier, and dispatch the streamed data to the destination window if the destination window is not the master window.

14. The apparatus of claim 13, wherein the destination window is the master window.

15. The apparatus of claim 13, wherein the destination window is one of the one or more slave windows.

16. The apparatus of claim 13, wherein the one or more slave windows each comprise a slave window client active data module that is adapted to determine if the master window has been closed; and
    designating its corresponding slave window as a new master window if it determines that the master window has been closed.

17. A computer readable storage medium having instructions stored thereon that, when executed by a processor, causes the processor to:
    receive data at a master window on a browser at a client computer from a server computer, the master window comprising a list of slave windows and said data comprising an envelope that comprises a window identifier;
    determine a destination window that corresponds to the window identifier; and
    dispatch the data to a first slave window if the destination window is not the master window.

18. The computer readable medium of claim 17, the instructions further causing the processor to:
    send a request for a first page to the server computer from a first requesting window;
    designate the first requesting window as the master window;
    establish a connection to the server computer from the master window.

19. The computer readable medium of claim 18, the instructions further causing the processor to:
    send a request for a second page to the server computer from a second requesting window;
    designate the second requesting window as a second slave window;
    register the second slave window with the master window.

20. A system for receiving streamed data comprising:
means for receiving data from a server computer at a master window displayed on a client computer, the master window comprising a list of slave windows and said data comprising an envelope that comprises a window identifier;
means for determining a destination window that corresponds to the window identifier; and
means for dispatching the data to a first slave window if the destination window is not the master window.

* * * * *

UNITED STATES PATENT AND TRADEMARK OFFICE
CERTIFICATE OF CORRECTION

| | |
|---|---|
| PATENT NO. | : 7,707,513 B2 |
| APPLICATION NO. | : 12/026819 |
| DATED | : April 27, 2010 |
| INVENTOR(S) | : Tal Broda et al. |

It is certified that error appears in the above-identified patent and that said Letters Patent is hereby corrected as shown below:

In column 13, line 18, in claim 2, delete "comprising;" and insert -- comprising: --, therefor.

Signed and Sealed this
Twelfth Day of April, 2011

David J. Kappos
*Director of the United States Patent and Trademark Office*